(12) United States Patent
Cunningham et al.

(10) Patent No.: US 6,314,826 B1
(45) Date of Patent: Nov. 13, 2001

(54) NESTED SPEED CONVERTER BEARING APPARATUS

(75) Inventors: Michael P. Cunningham, Londonderry, NH (US); Frank A. Folino, Salem; Faruk H. Bursal, Waltham, both of MA (US)

(73) Assignee: Synkinetics, Inc., Lowell, MA (US)

( * ) Notice: Subject to any disclaimer, the term of this patent is extended or adjusted under 35 U.S.C. 154(b) by 0 days.

(21) Appl. No.: 09/430,115

(22) Filed: Oct. 29, 1999

(Under 37 CFR 1.47)

(51) Int. Cl.$^7$ .................................................... F16H 1/34
(52) U.S. Cl. .......................................... 74/216.3; 475/168
(58) Field of Search ................... 475/183, 168; 74/63, 216.3; 476/36

(56) References Cited

U.S. PATENT DOCUMENTS

| | | |
|---|---|---|
| 1,689,285 | 10/1928 | Knab . |
| 1,738,662 | 12/1929 | Morrison . |
| 1,946,358 | 2/1934 | Porsche et al. . |
| 2,416,583 | 2/1947 | Hartley et al. . |
| 3,227,005 | 1/1966 | Johnson . |
| 4,584,904 * | 4/1986 | Distin et al. ........................... 475/168 |
| 4,604,916 * | 8/1986 | Distin .................................. 475/168 |
| 4,735,616 | 4/1988 | Morrison . |
| 4,838,741 * | 6/1989 | Dumoulin ............................ 409/131 |
| 5,312,306 | 5/1994 | Folino ................................. 475/196 |
| 5,514,045 | 5/1996 | Folino ................................. 476/36 |
| 5,533,424 | 7/1996 | Mimura ................................ 74/650 |
| 5,562,564 | 10/1996 | Folino ................................. 476/36 |
| 5,577,423 | 11/1996 | Mimura ................................ 74/650 |
| 5,607,370 | 3/1997 | Maslow et al. ....................... 475/196 |
| 5,683,323 | 11/1997 | Imase ................................. 475/168 |
| 5,873,800 | 2/1999 | Maslow et al. ....................... 476/38 |
| 5,954,615 | 9/1999 | Folino ................................. 476/36 |
| 5,989,144 * | 11/1999 | Chen et al. .......................... 475/196 |
| 5,989,145 * | 11/1999 | Bursal et al. ........................ 475/196 |
| 6,039,672 * | 3/2000 | Bursal .............................. 475/196 X |
| 6,068,573 | 5/2000 | Folino et al. ........................ 476/36 |
| 6,125,711 | 10/2000 | Bursal et al. ........................ 74/63 |
| 6,186,922 | 2/2001 | Bursal et al. ........................ 476/18 |

FOREIGN PATENT DOCUMENTS

| | | |
|---|---|---|
| 2346611 | 10/1977 | (FR) ..................................... 74/650 |
| 59-133863 | 8/1984 | (JP) . |
| 60-168954 | 9/1985 | (JP) . |
| 411002309A | 1/1999 | (JP) . |
| 1257-331-A | 2/1985 | (SU) . |
| 1368545 | 2/1985 | (SU) . |
| 1399-548-A | 12/1986 | (SU) . |
| 1490-362-A | 5/1987 | (SU) . |
| 1821597-A1 | 10/1990 | (SU) . |

OTHER PUBLICATIONS

"Balls Reduce Speed and Transmit Torque", *Mechanical Engineering & Technology Guide*; publ. prior to Mar. 14, 1991.

Dojen™ Precision Rotary Actuator Designer's Guide (Dir. of Lenze, Woburn, MA), published prior to Mar. 14, 1991.

"General Information on Sinusoidal Ball Drives", *Soviet Engineering Research*, vol. 6 (1986) Feb., No. 2 α pp. 23–26, Mowbray, Leicestershire G.B. (also referenced as *Sov. Engineering Research*, v. Mashinostroeniya, Jun. 1986, Issue 2, pp. 24–28).

* cited by examiner

*Primary Examiner*—Rodney H. Bonck
(74) *Attorney, Agent, or Firm*—Perkins, Smith & Cohen, LLP; Jacob N. Erlich; Jerry Cohen

(57) ABSTRACT

Robust nested speed converter and bearing apparatus providing speed conversion function and bearing support function in a compact package for a range of applications.

18 Claims, 17 Drawing Sheets

NESTED SPEED CONVERTER BEARING APPARATUS

BACKGROUND OF THE INVENTION

The present invention relates to mechanical power transmissions, and more particularly, to speed converters and the like.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated synchronization, and are quite labor intensive for both assembly and service. Other speed conversion applications include elevators, where an electric motor typically is employed for lifting and lowering the elevator cab, and robotics, where an electric motor is employed as an actuator to effect motion. Typically in these applications, the speed reducer housing is mounted ("grounded") directly to the equipment housing. At times the effect of speed reduction is also referred to as torque amplification, and these concepts may be treated as interchangeable, for purposes of this disclosure.

It is therefore an object of the present invention to provide a speed converter which is simplified in nature but is robust in transmission capability.

It is a further object of the present invention to provide a speed converter which is relatively easy to assemble and service.

It is an additional object of the present invention to provide a speed converter design which is adaptable to a variety of situations.

SUMMARY OF THE INVENTION

These and other objects are well met by the presently disclosed nested speed converting transmission. In one aspect of the invention, rotary motion is translated from a first speed at the rotary input to a second speed at the output, using a nested set: including a pair of wavy devices, a slotted device between the pair, and an oscillatable translating arrangement, preferably using ball or roller type translating elements loaded in the slots of the slotted device. In a preferred embodiment of the invention, two of the devices are rotatable about a common axis with the third device fixed about that axis. In an alternative embodiment, the third device is also rotatable about the same axis.

In a preferred embodiment of the invention, a set of bearings supports the front and back sides of the rotary parts of the apparatus. The resulting invention provides both speed conversion function and the bearing support function of the rotary parts in a nested speed converter bearing apparatus.

For ease of description, the cam devices described herein may also be referred to as gears or cam gears and the cam cycles may be referred to as teeth or cam gear teeth, all interchangeably and without limitation. Devices with two cam gear parts, a slotted gear part and interacting rolling elements are described herein. These interacting elements may be balls, rollers, pins, bushings, ball bearing assemblies, or the like. The terms drive and driven may be applied to various ones of the three gear parts, depending upon an application.

In various embodiments of the invention, the inner and outer cam gears are each formed on a face of a respective primary and secondary disk, and the slots are formed as radial slot paths in the intermediate gear disk. Each of the primary and secondary cam gears has a respective flank. Projections of these flanks intersect at unique points upon rotation of at least one of the cam gears, associated ones of these unique points defining respective ones of the slot paths in the intermediate part.

A respective roller in a respective slot path is driven radially between a maximum and minimum radius by the rotary input. In one embodiment the inner cam gear is the rotary input and the slotted intermediate disk is a reaction disk for reacting the drive force on the rollers in the slots. The outer cam gear is driven into rotation by action of the sequence of radially oscillating rollers. In another embodiment, the slotted intermediate disk is driven into rotation by action of the rollers, with the drive force on the rollers being reacted by a fixed cam gear part.

In one embodiment of the invention, the cam gears are designed to cause a linear displacement of the rollers for a given cam gear rotation and cooperation of the cam gears results in essentially constant linear velocity of the radially traveling rollers during the bulk of their driving motion.

In one embodiment of the invention, the cams gears are designed as a conjugate pair in that the theoretical centerline of a respective slot is defined as the loci of the contact of the cam gears at the slot for a given angular location.

In one embodiment of the invention, the primary cam contour varies substantially linearly with angular rotation at a first rate of variation. The secondary cam contour varies substantially linearly with angular rotation at a second rate of variation. The relationship of these variations determines the speed conversion ratio of the apparatus. In accordance with the foregoing, the speed ratio of an embodiment of the invention can be determined by comparing the number of cycles of the secondary cam to the number of cycles of the primary cam.

In a preferred embodiment of the invention, the disclosed speed converter using cam gears is integrated with support bearings, in a compact drive mechanism. The center of the apparatus is preferably open for receipt of a drive shaft input or driven shaft output to a load.

In one embodiment of the invention, the first of the wavy pair of devices, and preferably a conjugate pair of devices, is coupled to an input of the translation arrangement and the second of the pair is coupled to an output of the translation arrangement, such that motion of the first of the devices can be translated to motion of the second of the devices by the translation arrangement, with the slotted device being part of the translating arrangement.

In another aspect of the invention, a method is provided for translating the speed of a drive shaft which is driven at a first speed to the speed of a driven shaft at a second speed. The method includes the steps of providing a drive element having a drive cam, a driven element having a driven cam, and at least one reciprocating transfer element interacting between the two cams in a slotted retainer, whereby the driven cam can be driven at the second speed by the drive cam driven at the first speed.

The inner cam gear part, the intermediate slotted part, and the outer cam gear part together can be thought of as disks or cylinders. In a pancake-type transmission embodiment of the invention, the rotary motion and angular velocity of one of the three disks is efficiently translated via the translating part into rotary motion and angular velocity of a second of the disks.

The surfaces of the rollers (or balls) and the flanks or surfaces of the cam gears and of the slots that interact with the rollers (or balls) may be referred to collectively as "working surfaces" of the apparatus. The term track herein should be understood as to refer to the path of the interacting element on a working surface. An ideally designed track and ball type speed converter described herein may offer zero backlash from perfect interaction of all working surfaces. The present invention is directed to provision of improved efficiency of power transmission and to improved volume utilization, in a speed converting device.

In a preferred practice of the invention, a stable, robust and well-spindled speed converting bearing apparatus is provided for converting rotary motion input to output having a conjugate pair of cam gear parts and a translating part. The translating part includes an intermediate gear part with slots defined therein, preferably radially extending slots. These three parts are mounted about a common axis, having an input and output rotatable about the axis, with a roller device loaded in each slot. The cam gear parts are coupled together via the rollers. A first of the conjugate pair is an inner cam gear and the second of the pair is an outer cam gear. The intermediate part is nested in between the cam gears. All of these parts have front and rear faces, wherein the slotted part is essentially cylindrical and defines a bearing surface around its inner circumference adjacent to its front face and adjacent to its rear face and defines a bearing surface around its outer circumference adjacent to its front face and adjacent to its rear face. The inner cam gear part is essentially cylindrical and defines a bearing surface around its outer circumference adjacent to its front face and adjacent to its rear face. The outer cam gear defines a bearing surface around its inner circumference adjacent to its front face and adjacent to its rear face. Rotation of a first of the parts as input rotates a second of the parts as output, and this output rotation is dictated by the relationship of the cam gears and slots. Preferably the outer cam gear and intermediate slotted gear parts have open centers to facilitate nesting, while the inner cam gear part has an open center to accommodate shaft-mounting thereat.

In a preferred embodiment, a conjugate pair of devices is provided with an intermediate device, ones of which are rotatable about a common axis, for translating motion of a first of the devices at a first velocity to motion of a second of the devices at a second velocity, the first of the devices coupled to an input of a translating part and the second of the devices coupled to an output of the translating part, whereby motion of the first of the devices can be translated to motion of the second of the devices.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 9A' and FIG. 9B' show alternative mounting arrangements of the invention.

DETAILED DESCRIPTION OF A PREFERRED EMBODIMENT

Figures 1A, 1B:
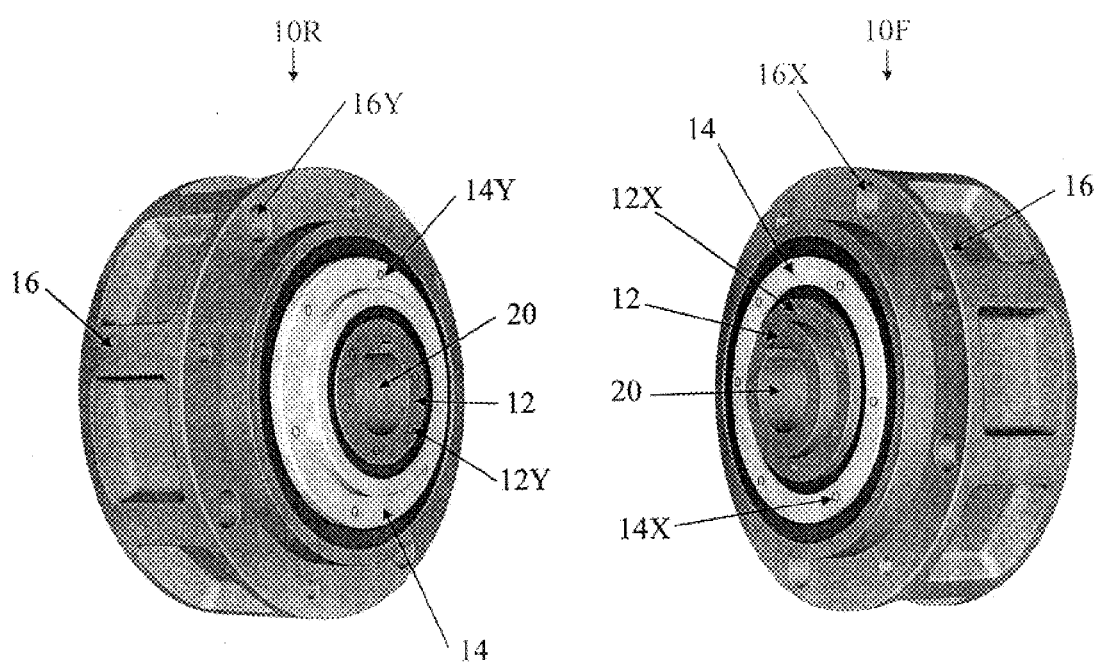
FIGS. 1A–B is a perspective view of the front 10F and rear 10R sides of a preferred embodiment of the invention.
Figure 1C:
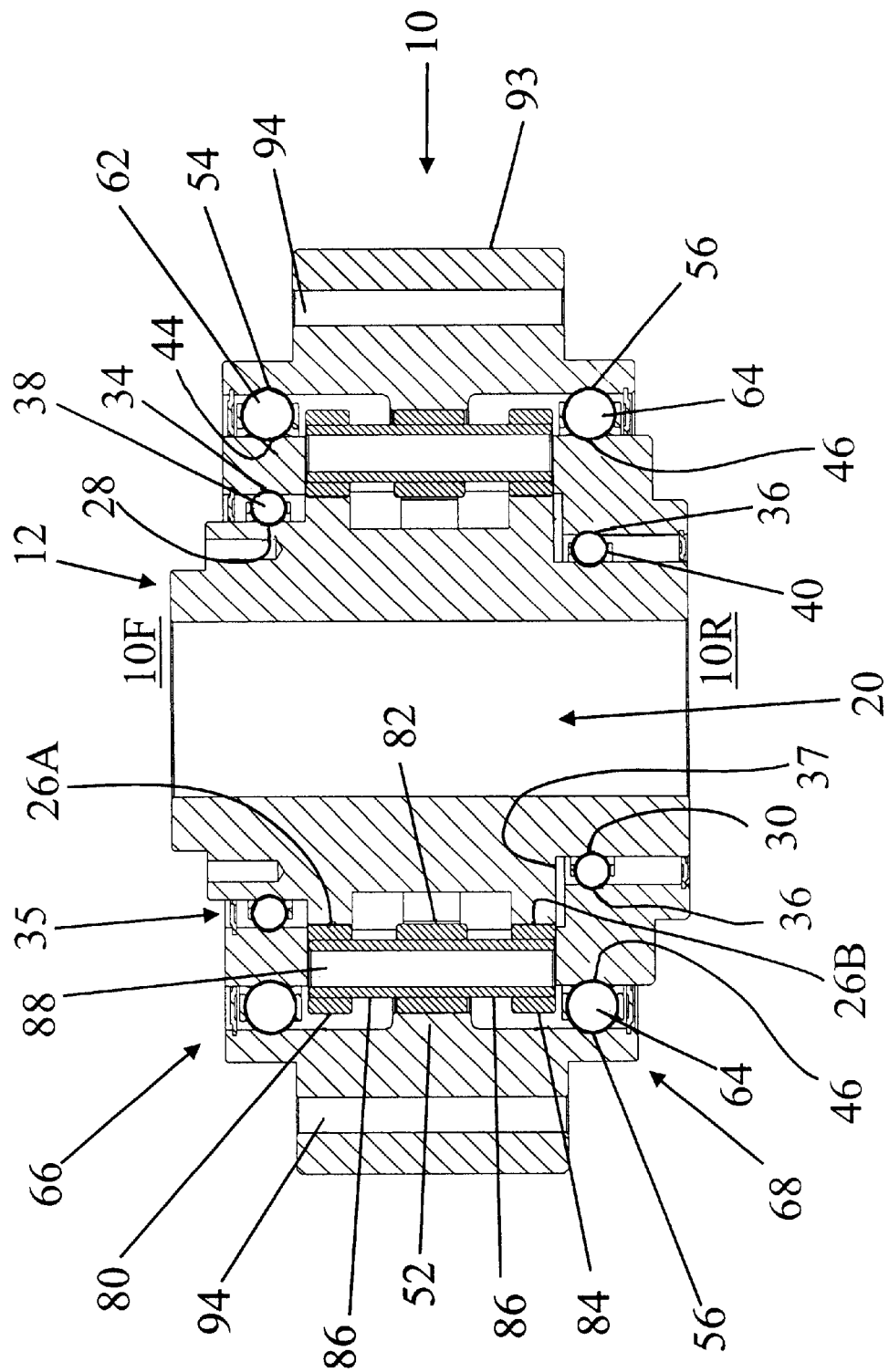
FIG. 1C is a sectional view of the embodiment of FIGS. 1A–B.
Figure 1D:
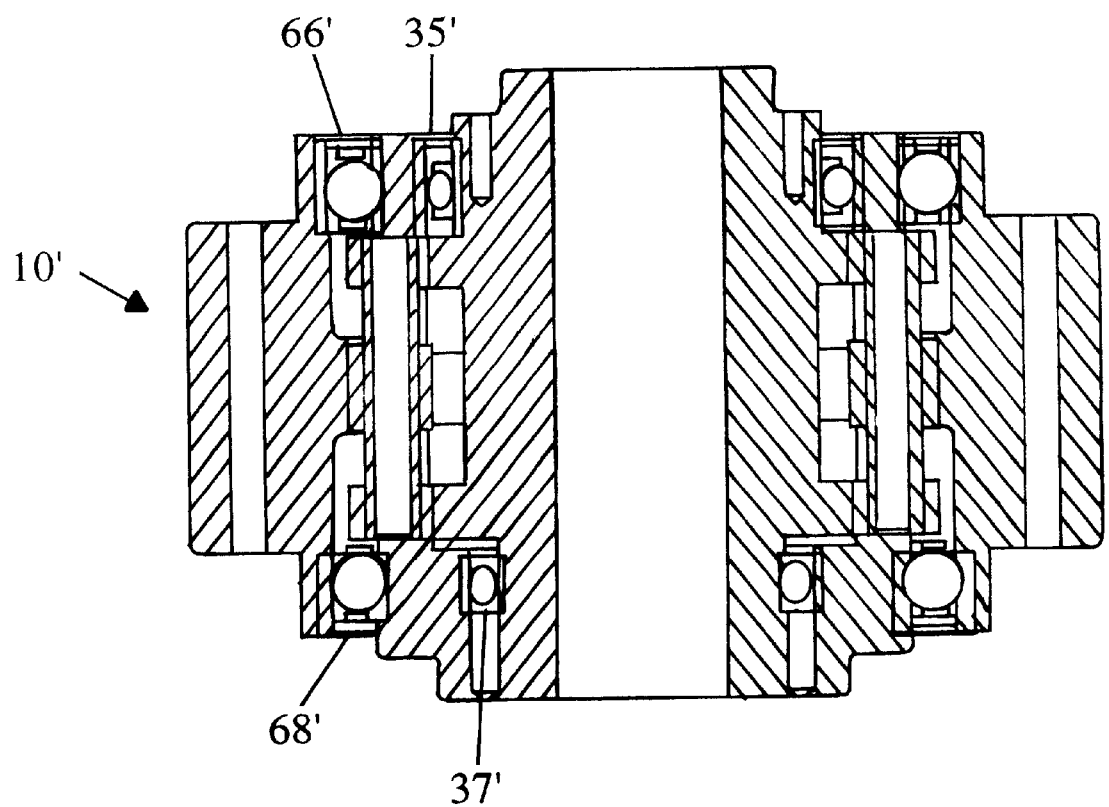
FIG. 1D is a sectional view of an alternative embodiment of the apparatus of FIGS. 1A–B.

A preferred embodiment of nested speed converter bearing apparatus 10 of the present invention is shown in FIGS. 1A–C. In this embodiment, the three major gear components of the embodiment of FIG. 1, shown in FIGS. 2–4, include inner cam gear 12, intermediate slotted gear 14, and outer cam gear 16. These parts interact via roller assembly 18, shown in FIG. 5. In the preferred embodiment, apparatus 10 defines an open center 20 for shaft mounted applications.

Figure 2A:
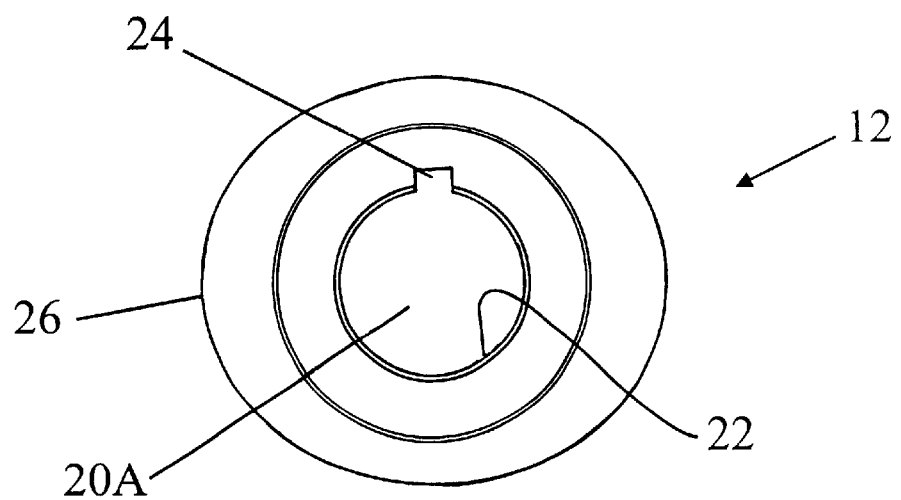
FIG. 2A is a face view of the inner cam gear part of the embodiment of FIG. 1.
Figure 2B:
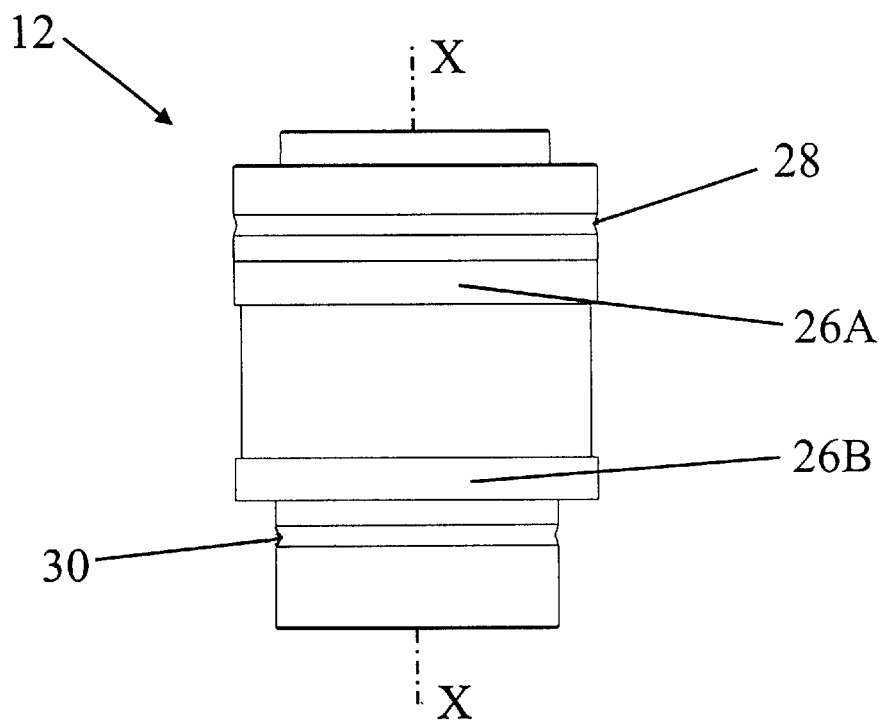
FIG. 2B is a side view of the inner cam gear part of the embodiment of FIG. 1.

Inner cam gear 12 is shown in FIGS. 2A–B as essentially cylindrical with an open center 20A. The open center forms a shaft receiver 22 and is provided with a splining or keying 24 for engagement with a splined or keyed shaft or a driving or driven device. The inner cam gear 12 has two identical cam-like cam gear surfaces 26A, 26B formed relative to the longitudinal axis X of the part. Also provided are front and rear bearing races 28, 30. In this embodiment, the two cam gears 26A, 26B each have two cycles (also referred to as lobes or teeth) on each of the cam gears 26A, 26B.

Figure 3A:
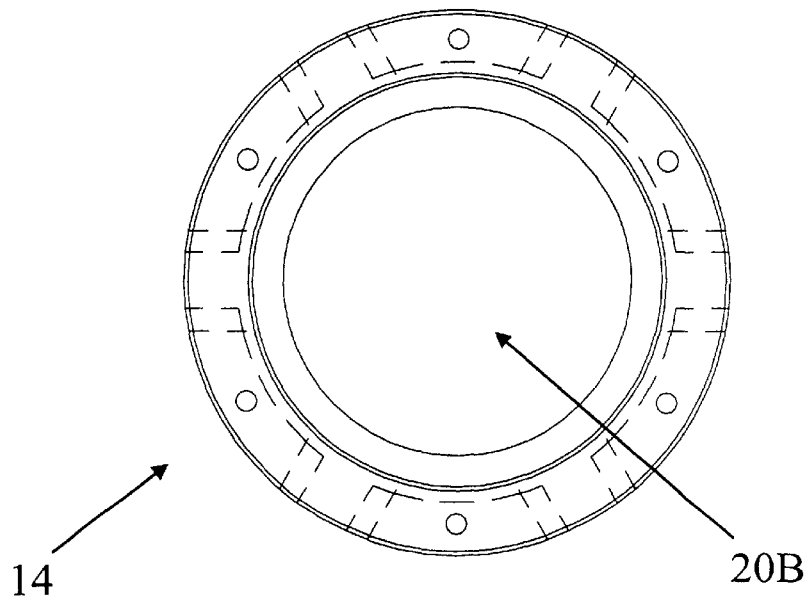
FIG. 3A is a face view of the slotted intermediate gear part of the embodiment of FIG. 1.
Figure 3C:
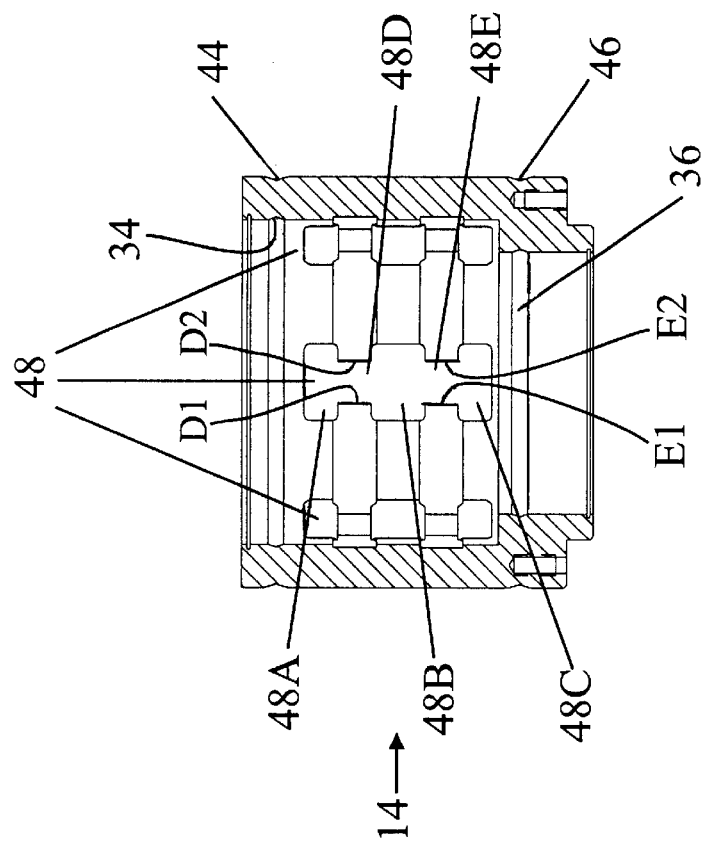
FIG. 3C is a sectional view of the slotted intermediate gear part of the embodiment of FIG. 1.
Figure 3B:
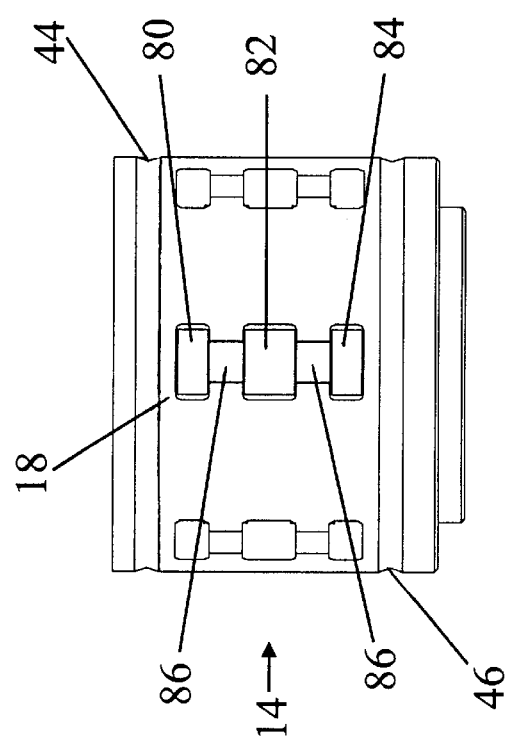
FIG. 3B is a side view of the slotted intermediate gear part of the embodiment of FIG. 1.

Slotted intermediate gear part 14 is shown in FIGS. 3A–C as essentially cylindrical with an open center 20B. Bearing races 34, 36 are defined on its inner surface. Balls or rollers 38,40 are loaded in between races 30, 34 and 28, 36 to form integral bearings 35, 37. Slotted part 14 also has bearing races 44, 46 defined on its outer surface. Slots 48 are defined in the surface of intermediate part 14 for receipt of roller assembly 18 as shown in FIGS. 3B and 5.

Figure 4A:
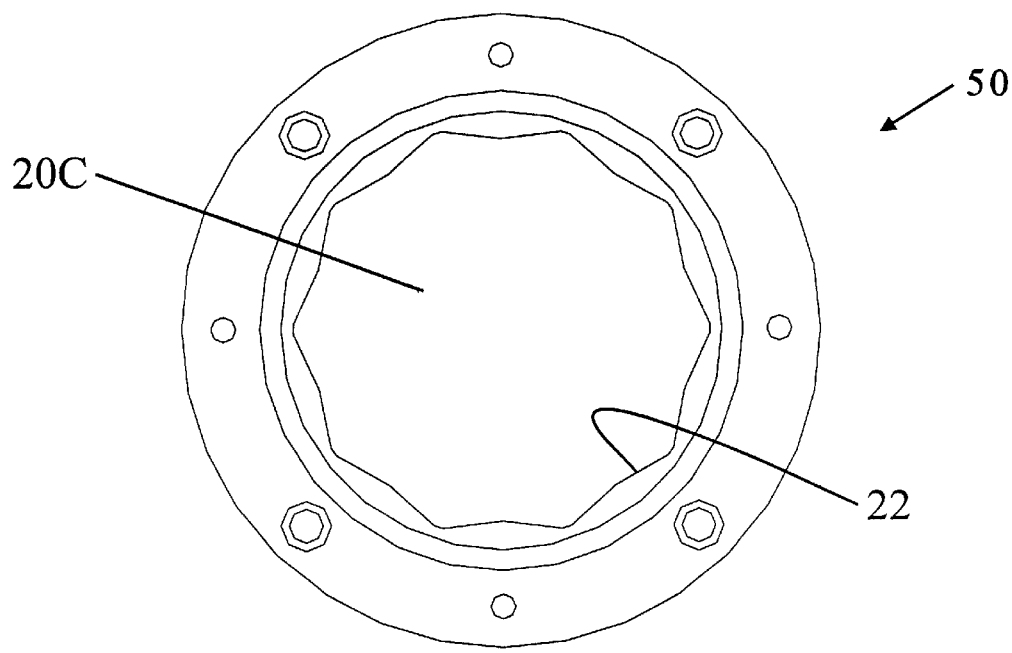
FIG. 4A is a face view of the outer cam gear part of the embodiment of FIG. 1.
Figure 4B:
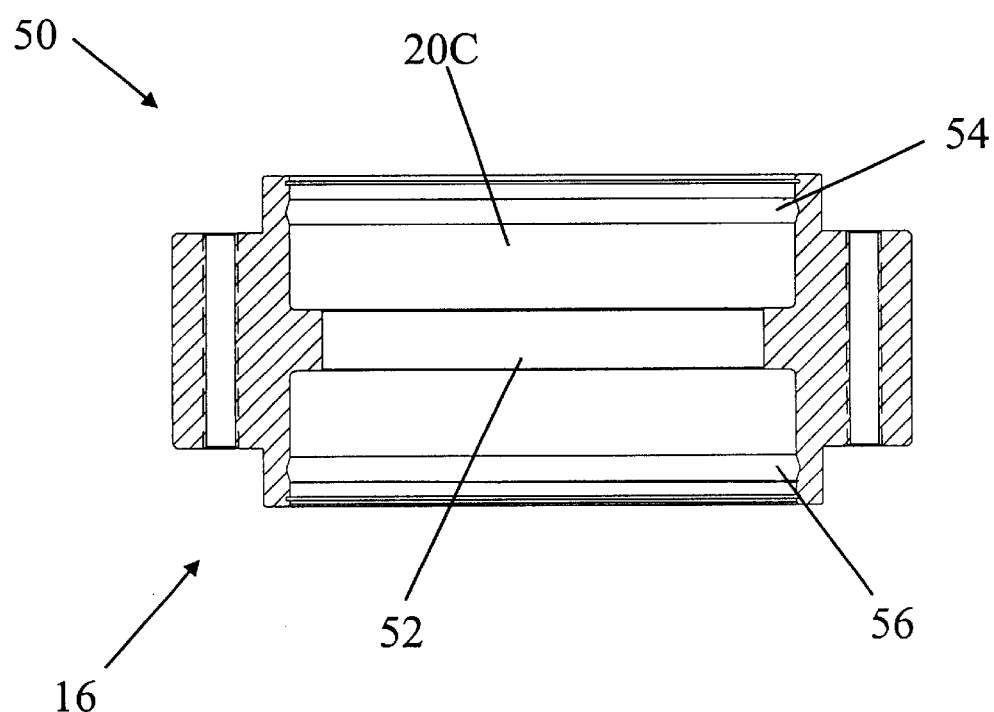
FIG. 4B is a sectional view of the outer cam gear of the embodiment of FIG. 1.

Outer cam gear 16 is shown in FIGS. 4A–B as essentially cylindrical with an open center 20C for receipt of the slotted part 14. The outer cam gear 50 has a cam-like gear surface 52 formed on the interior surface of the part. Also provided are bearing races 54, 56. In this embodiment there are 10 cam gear cycles (or teeth) defined by the cam gear 52. The internal diameter is such that outer part 16 fits over and receives slotted part 14. Balls or rollers 62, 64 are loaded in between races 44, 54 and 46, 56 to form integral bearings 66, 68.

Loading of the bearing elements, whether balls or rollers, along with separators retainers and the like to form integral bearings 35, 37, 66, and 68 can be accomplished in the usual manner for known bearings, as will be appreciated by a person skilled in the art. Forming of integral bearings results in a compact mechanism, wherein the inner, intermediate and outer parts provide the bearing races described above. In an alternative embodiment 10', shown in FIG. 1D, integral bearings 35, 37, 66, 68 have been replaced with off-the-shelf bearings 35', 37' 66', and 68', which are mounted in the manner of installing of known bearings, wherein the inner, intermediate and outer parts provide bearing seats instead of bearing races, as will be appreciated by a person skilled in the art.

Figure 5:
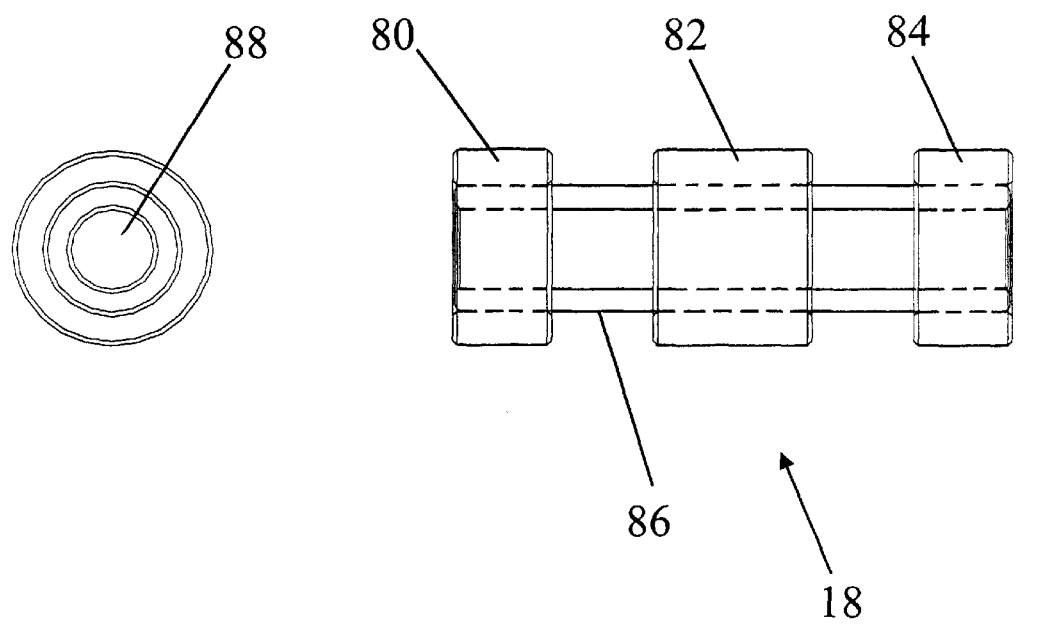
FIG. 5 is a side view of a preferred roller assembly of the embodiment of FIG. 1.

In the embodiment of FIG. 5, roller assembly 18 is formed with three bushings 80, 82, 84 mounted on pin 86. Pin 86 can be a solid part, although it is shown in FIG. 5 having a hollow center 88. The hollow center adds some compliance and reduces inertial effects by reducing weight, which is desirable in some applications. Bushing 80 rolls on pin 86 and against cam gear surface 26A of inner part 12, and bushing 84 rolls on pin 86 and against cam gear surface 26B of inner part 12. Bushing 82 rolls on pin 86 and against cam gear surface 52 of outer part 16.

The advantage of having three bushings on a pin is that each of the contacts of the rollers with the parts 12, 14, 16 are isolated to a separate rolling interface in a manner that permits a high degree of rolling action while efficiently accomplishing the desired speed conversion. This arrangement reduces sliding and can add to the life and efficiency of apparatus 10.

Each of the slots 48 are formed in this embodiment with open sections 48A–48E. Section 48A accommodates roller 80 without contact. Section 48B accommodates roller 82 without contact. Section 48C accommodates roller 84 without contact. Section 48D accommdates pin 86, with potential contact on the pin at lands D1 and D2, depending on rotational direction. Section 48E accommodates pin 86, with potential contact on the pin at lands E1 and E2, depending on rotational direction. As will be appreciated by a person skilled in the art, this dependency on rotational direction means that during rotation of the input one or the other of these potential contacts actually occurs as part of the normal driving function of the invention.

With bearings 35, 37, 66 and 68, coupling parts 12, 14, 16 together, any of the gear parts 12, 14 or 16 can be a rotary input, ground or rotary output of apparatus 10. In typical operation, one of these components is grounded, such as being tied to a machine housing or motor housing, and acts as a reacting element. Thus drive forces from the rotating input applied to the roller assembly 18 are reacted via the fixed grounded part while driving the output into rotation. In an alternative embodiment, no part is grounded, and the apparatus performs a differential drive function.

This flexibility of use is further facilitated by provision of mounting holes on parts 12, 14 and 16 on both front 10F and rear 10R faces of apparatus 10. Hence, part 12 is provided with mounting holes 12X, 12Y on both its front and rear sides, part 14 is provided with mounting holes 14X, 14Y on both its front and rear sides, and part 16 is provided with mounting holes 16X, 16Y on both its front and rear sides. Thus any of these parts 12, 14, 16 can be mounted, and then again flanges, shafts, torque arms and the like can be mounted to any of these parts, as desired. As a result of this flexibility, one mechanism can serve a multitude of applications. The result of this flexibility is the real possibility of higher volume of applications and use per a given forging, and with the increased possibility of availing volume manufacturing techniques to drive down production costs. The end result desired is a reduced cost, high quality, robust, compact and flexible speed converting bearing assembly.

Figure 6:
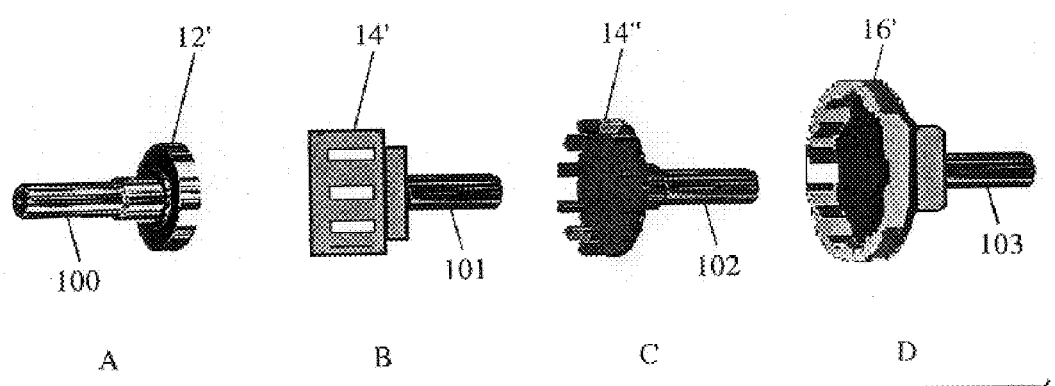
FIGS. 6A–D are side views of alternative gear parts of the invention.

FIGS. 6A–D shows alternative shafting and mounting embodiments of the invention. FIG. 6A shows the inner cam gear 12' with a shaft 100. FIG. 6B shows intermediate part 14' with shaft 101. FIG. 6C shows an intermediate part 14" with shaft 102. FIG. 6D shows outer cam gear 16'with shaft 103. This shafting can be integral or attached via the mounting holes described above.

Figure 7A:
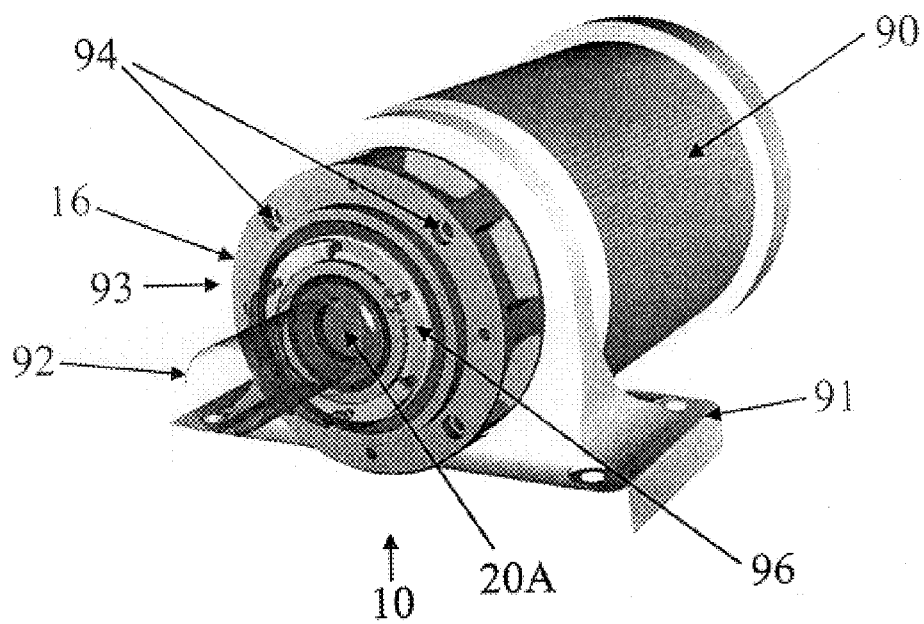
FIGS. 7A–C are perspective views of alternative embodiments of the present invention.
Figure 7B:
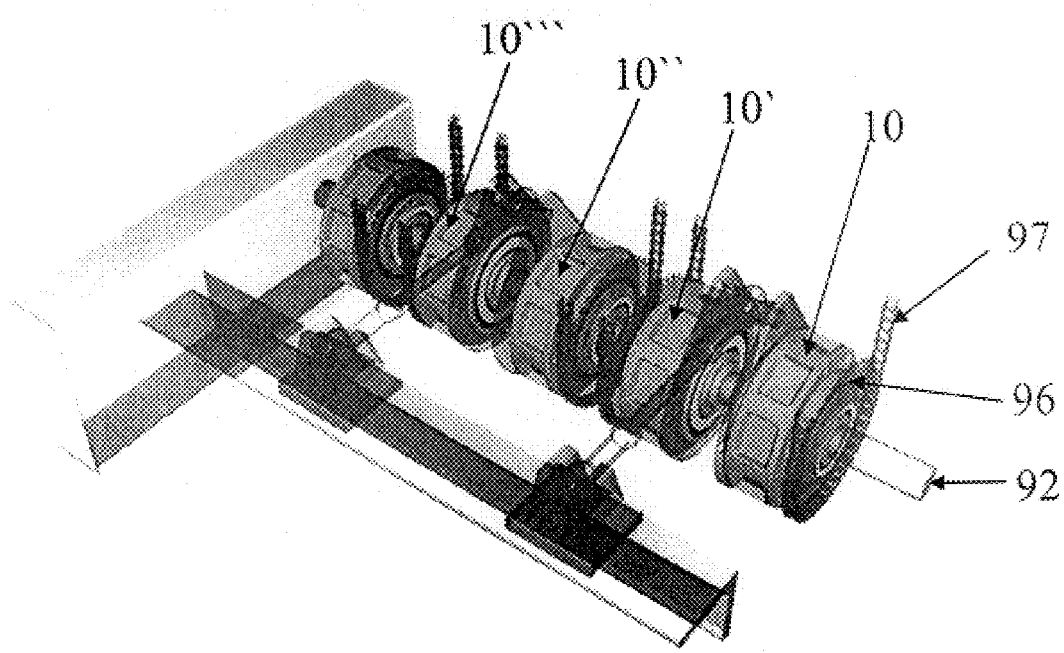

Apparatus 10 is shown in FIG. 7A mounted on a motor 90 mounted on a frame 91. Motor shaft 92 is keyed with keyed open center 20A of the inner part 12 to drive inner part 12 as a rotary input. Outer part 16 acts as a housing part 93 and is mounted to the frame 91 and motor via bolts (not shown) at bolt holes 94 (see 16X or 16Y of FIGS. 1A–B). The output is taken via sprocket 96. FIG. 7B shows an example of a sprocket output 96 for driving a chain 97. Such output could be on the intermediate part or the outer part, with the inner cam gear acting as the rotary input. In this embodiment, motor shaft 92 also extends through apparatus 10 to enable mounting of additional drives 10', 10", 10''', such as shown in FIG. 7B; each output of drives 10, 10', 10", 10''' drives a separate chain to a separate load and each drive has its own speed conversion characteristics as determined by its cam gear configuration.

Figure 7C:
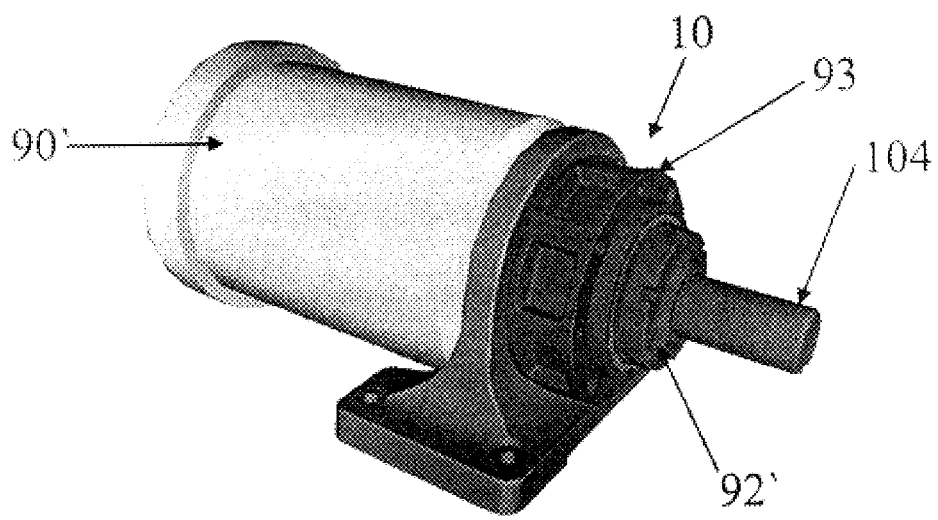
Figure 8B:
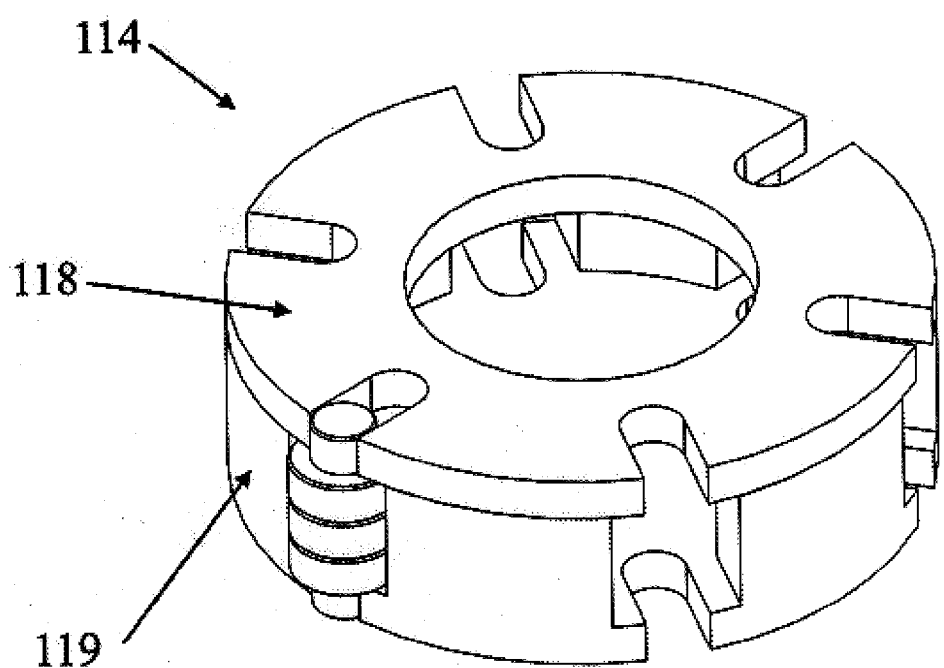
FIGS. 8A–C, E are sectional views of alternative roller arrangements of the invention.
Figure 8A:
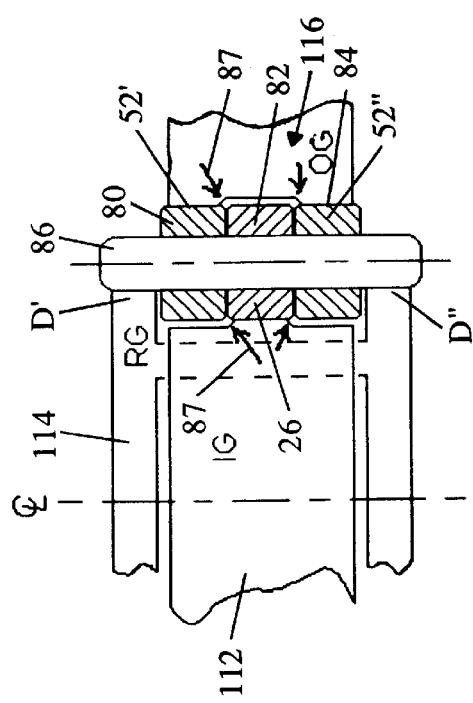
Figure 8D:
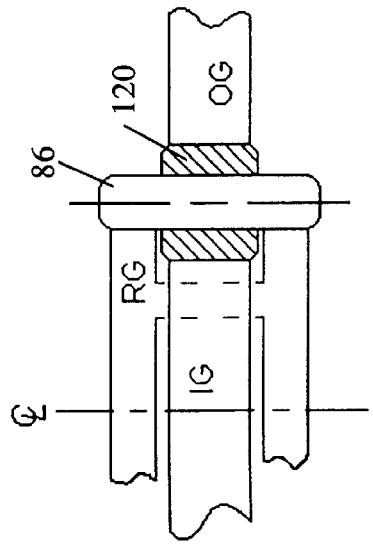
FIG. 8D is a perspective view of the roller of FIG. 8A loaded in the slot of a slotted intermediate member alternative embodiment of the invention.
Figure 8C:
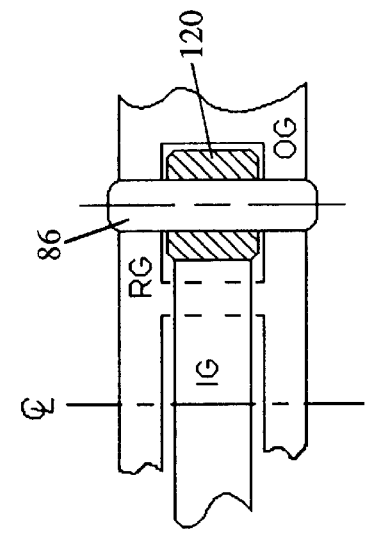
Figure 8E:
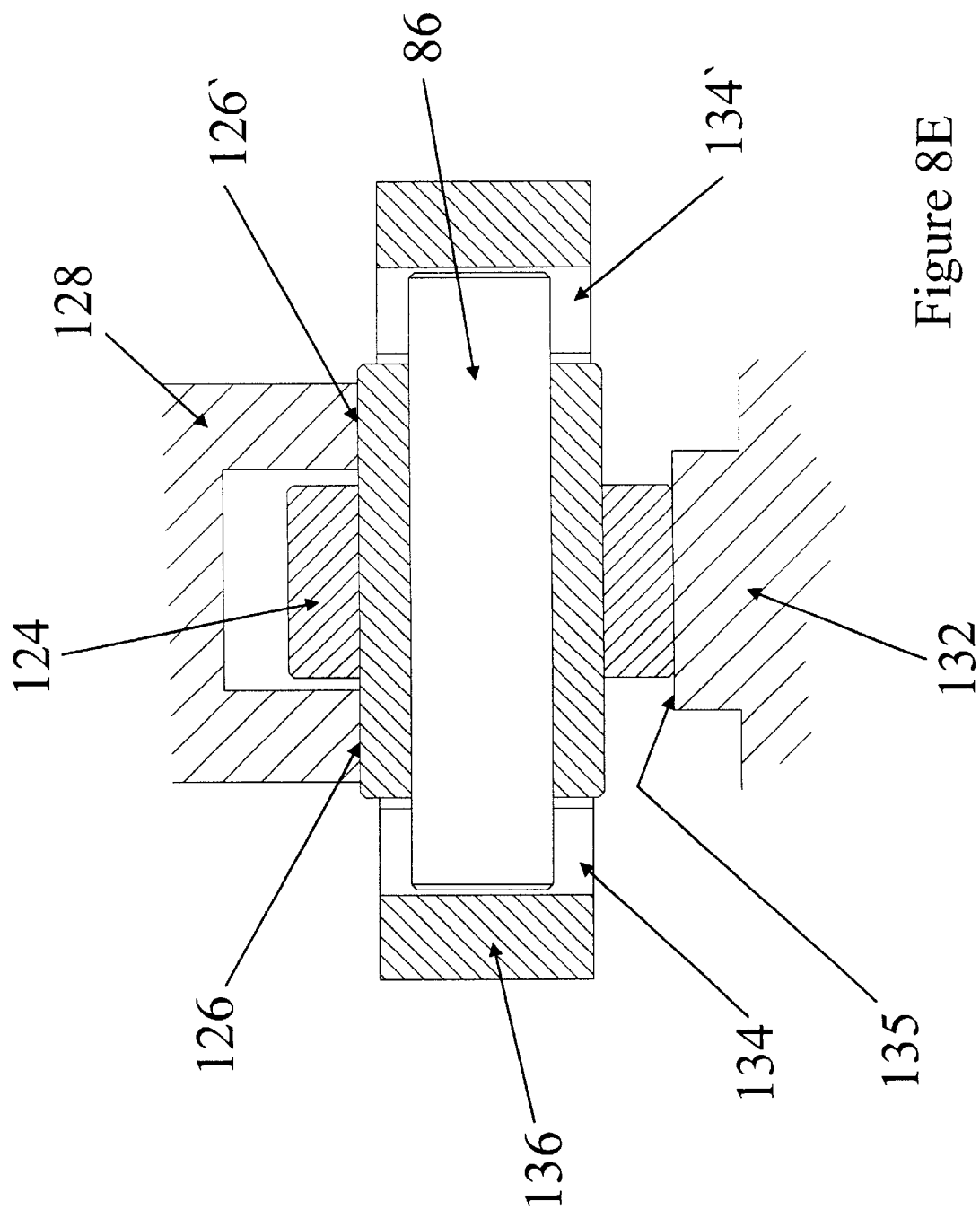

In alternative embodiment shown in FIG. 7C, the motor 90' is mounted to the housing 93 and frame 91. The motor shaft 92' fits into and drives the inner cam gear of apparatus 10, but the shaft does not extend further. The output shaft 104 of the apparatus (such as one shown in FIG. 6) is mounted on the rotary intermediate part 14. The outer cam gear part 16 is part of the fixed housing 93.

As shown in FIGS. 3B- and 1C, for each driven roller set 18, rotation of inner part 12 drives the bushings 80, 84 (on pin 86) via contact at cam gear surfaces 26A, 26B radially in and out at slot 48 without contact of the bushings on the slot surfaces of part 14 or at outer cam gear 52 on part 16. Pin 86 contacts the slot at two surfaces, either the set of surfaces D1 and E1 or the set of surfaces D2 and E2, depending on the direction of rotation of the input. Bushing 82 on the radially driven pin 86 rolls along the surface of outer cam gear 52 of outer part 16. The rotary input thus drives the intermediate part 14 into rotation as the rotary output of apparatus 10; the outer cam gear is formed on the interior of the bolted and fixed ("grounded") outer part 16, and thus acts as a fixed reaction part.

FIGS. 8 A–D shows alternative embodiments of the invention. In FIG. 8A the three rollers 80, 82, 84 are mounted on pin 86. Roller 82 contacts the drive surface 26 of inner cam gear 112. Pin 86 contacts two drive surfaces D' and D" of intermediate part 114. The two outer rollers 80 and 84 contact the two cam gears surfaces 52' and 52" of outer cam gear 116. Arrows 87 indicate chamfered edges to avoid high wear points that may result from non-parallelisms during operation. FIG. 8B shows one application of the embodiment of FIG. 8A, having a two-part intermediate part 114 with two slotted parts 118 and 119. The roller set of FIGS. 8A, 8B is seated in part 114 as shown. In FIG. 8C pin 86 has a single bushing 120 contacting the inner cam gear or outer cam gear. In FIG. 8D pin 86 has a single bushing 120 contacting the inner cam gear and outer cam gear. In FIG. 8E, a single elongated bushing 122 is mounted on pin 86 and a second narrower bushing 124 is mounted on bushing 122. Bushing 122 contacts the drive surfaces 126, 126' of outer cam gear 128. Outer cam gear 128 straddles bushing 124. Bushing 124 contacts the single drive surface 130 of inner cam gear 132. Pin 86 contacts and rides on contact surfaces 134, 134' of intermediate part 136.

It will be appreciated that in various embodiments of the invention, any of the three main gear parts can be a rotary input, ground or rotary output. In one practice of the invention, one of these components is grounded, such as being tied to a machine housing or motor housing, and acts as a reacting element. Thus drive forces from the rotating input applied to the rollers or roller sets are reacted via the fixed grounded part while driving the output into rotation. In an alternative embodiment of the invention, none of the components is fixed and a differential function is performed between the three parts rotating at different rates.

Figure 9A:
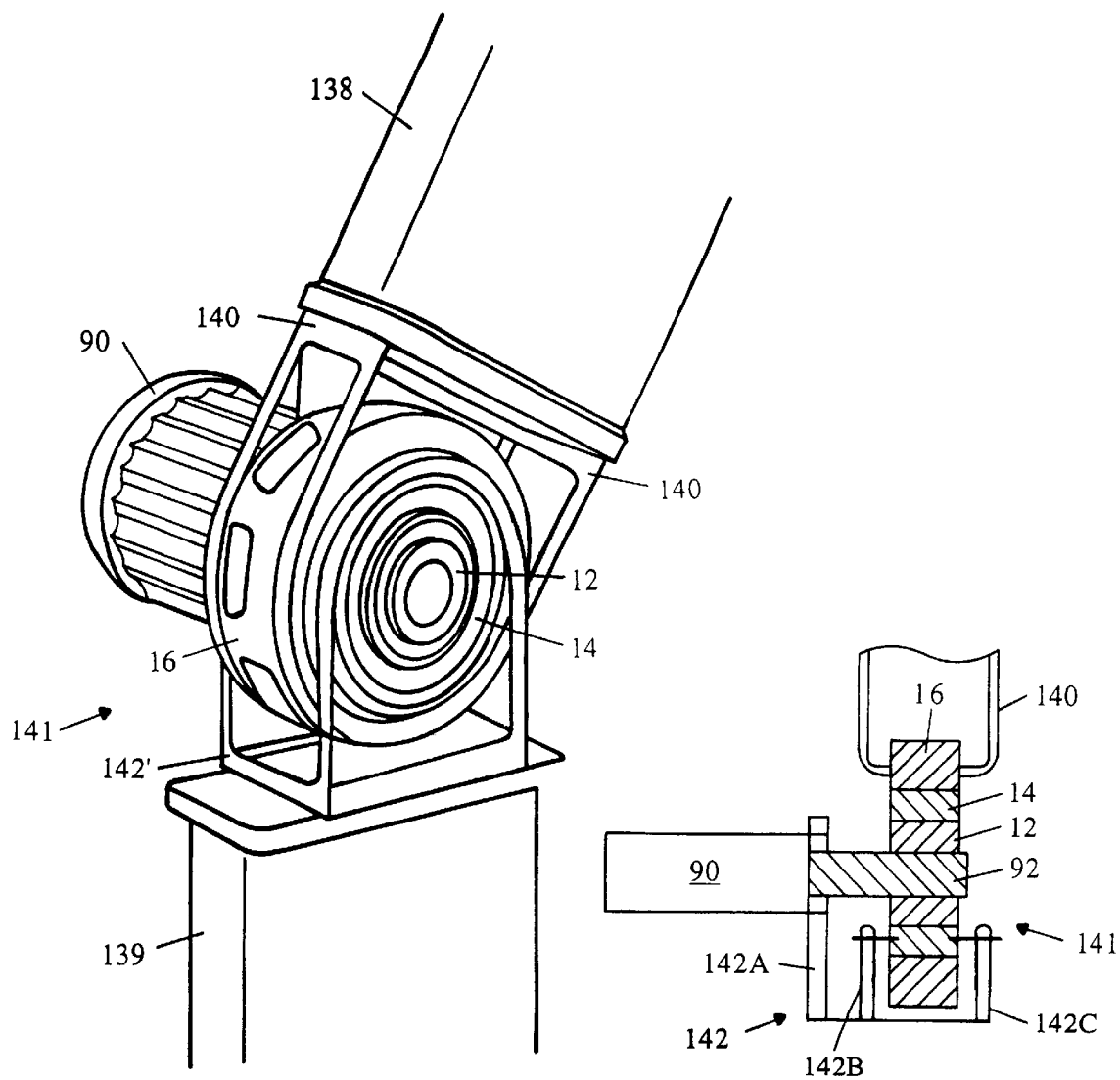
FIGS. 9A–D show alternative practices of the invention, such as for driving a robot arm.
Figure 9B:
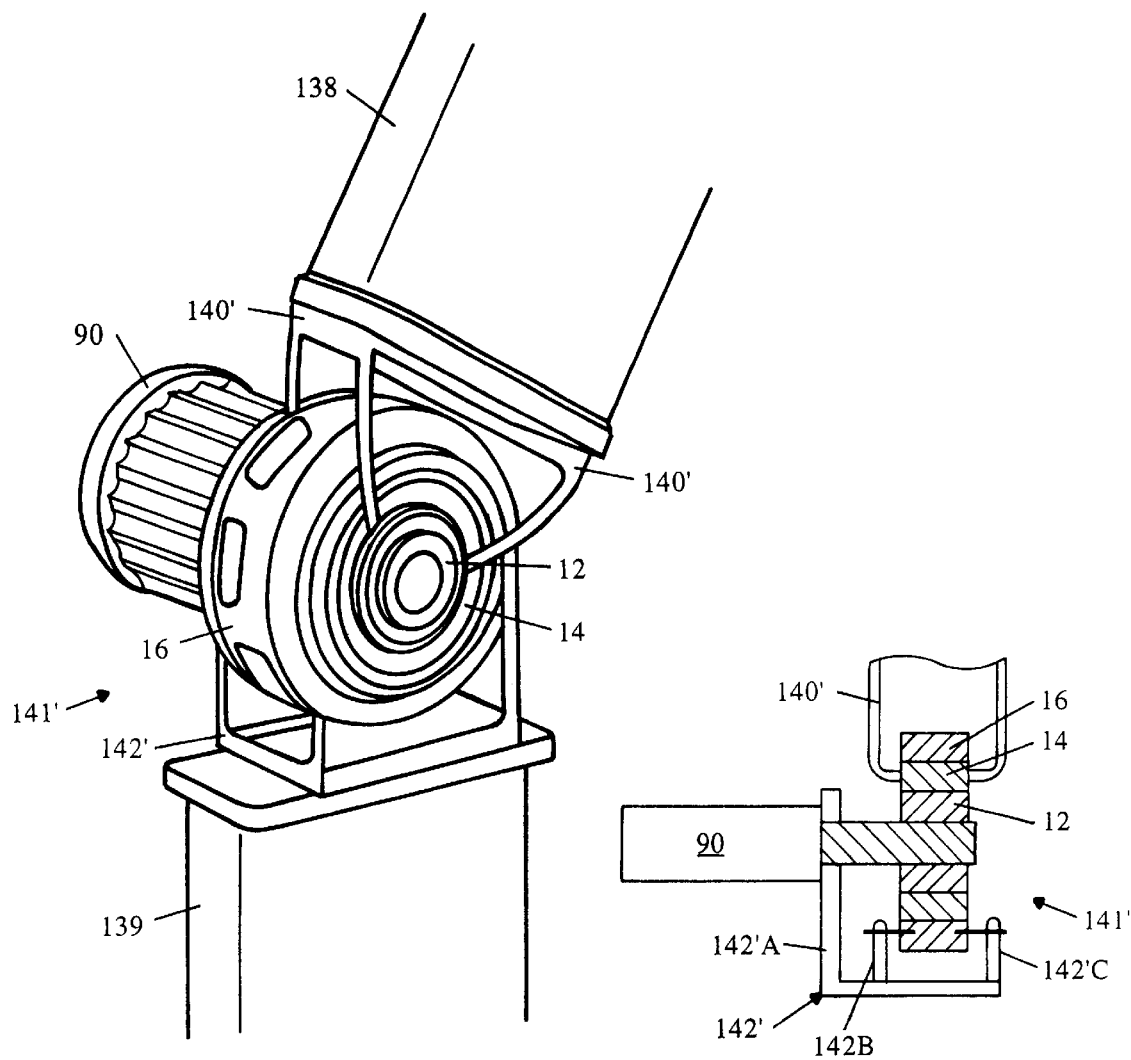

FIGS. 9A–B are alternative practices of the invention wherein the motor 90 (mounted on fixed based 139 via stand 142) drives the inner cam gear 12 as an input. Arm 138 is mounted on the outer cam gear 16 via yoke 140 (FIG. 9A) or on the intermediate part via yoke 140' (FIG. 9B) as output. Arm 138 is attached to the output via the yoke on both sides of the apparatus. The yoke takes advantage of the bearings 35, 37, 66, 68 on both sides of the apparatus to provide substantial lateral stability and a high rating for overhung loads and overturning moment.

As shown in FIG. 9A', motor 90 mounts to flange 142A of stand 142, with motor shaft 92 driving inner cam gear 12 as the input. The fixed intermediate slotted part 14 is mounted between flanges 142B and 142C of the fixed stand 142. Flange 142A is separated from flange 142B to provide clearance for the desired range of travel of the output yoke 140 mounted to the outer cam gear 16 as the output.

The mounting is different in the embodiment of FIG. 9B. As shown in FIG. 9B', motor 90 is mounted on flange 142'A of stand 142' with motor shaft 92 driving inner cam gear 12 as the input. The fixed outer cam gear 16 is mounted between flanges 142'B and 142'C of the fixed stand 142'. Flange 142'A is separated from flange 142'B to provide clearance for the desired range of travel of the output yoke 140' mounted to the intermediate part 14 as the output.

The yoke and stand attachment is accomplished on both sides of the apparatus via the associated mounting holes 16X, 16Y on outer cam gear part 16 and associated mounting holes 14X, 14Y on intermediate part 14 on both front 10F and rear 10R sides of the apparatus.

Figure 9C:
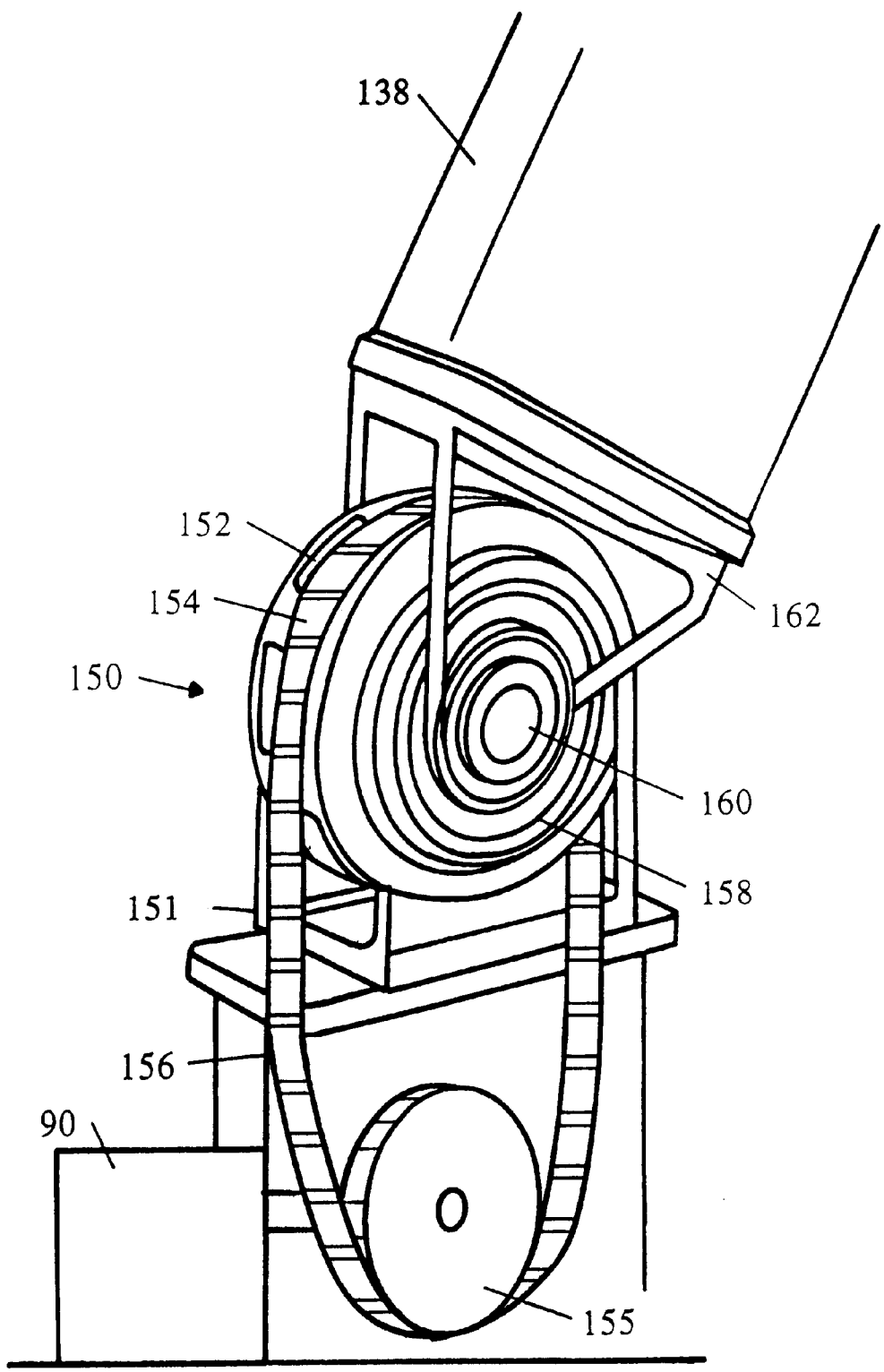

In the embodiment of FIG. 9C the motor 90 is separated from the robotic drive 150 to reduce size and weight at the joint (i.e., at the location where the arm 138 is articulated). The rotary outer cam gear part 152 is the input for drive 150 and has a pulley 154 defined on its exterior that is rotated via motor pulley 155 and belt 156. The slotted intermediate gear 158 acts as grounded part mounted to frame 151 via mounting hole 14X, 14Y. The rotary output inner cam gear 160 is coupled via bolts at mounting holes 12X, 12Y and yoke 162 to arm 138. Rotation of the rotary output positions arm 138 accordingly. This embodiment is an external drive with the outer cam gear acting as the input and the inner cam gear acting as the output.

Figure 9D:
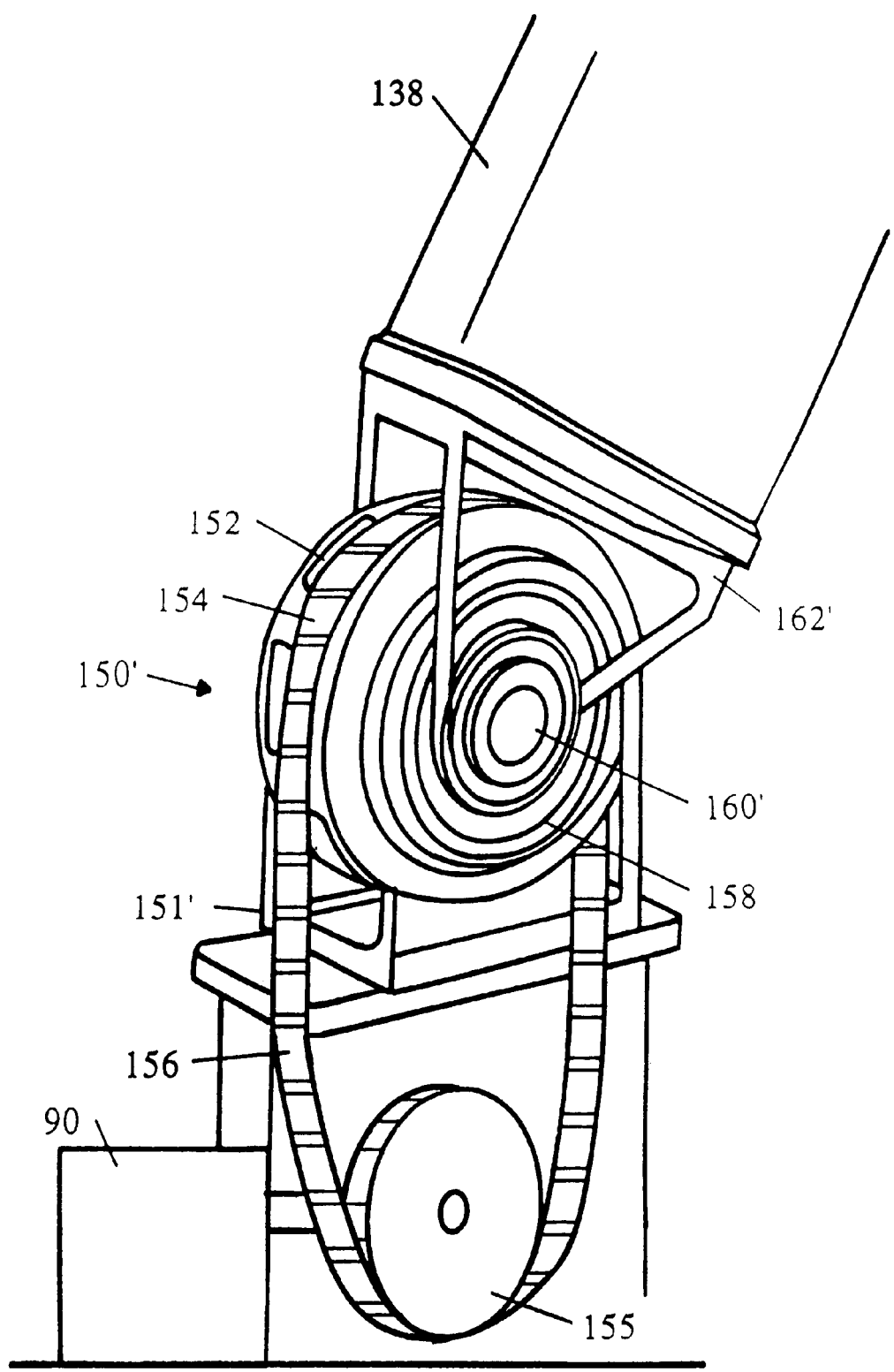

FIG. 9D is an alternative embodiment of the embodiment of FIG. 9C. Similarly, motor 90 is separated from robotic drive 150' to reduce size and weight at the joint where the arm 138 is articulated. The rotary outer cam gear part 152 is the input for drive 150 and has a pulley 154 defined on its exterior that is rotated via motor pulley 155 and belt 156. The inner cam gear 160 is fixed to frame 151'. The rotary output intermediate gear is connected via yoke 162' to arm 138. Rotation of the rotary output positions the arm 138 accordingly. (While a belt and pulley arrangement is described herein, a chain and sprocket might be used interchangeably for purposes of this disclosure.)

Figure 10:
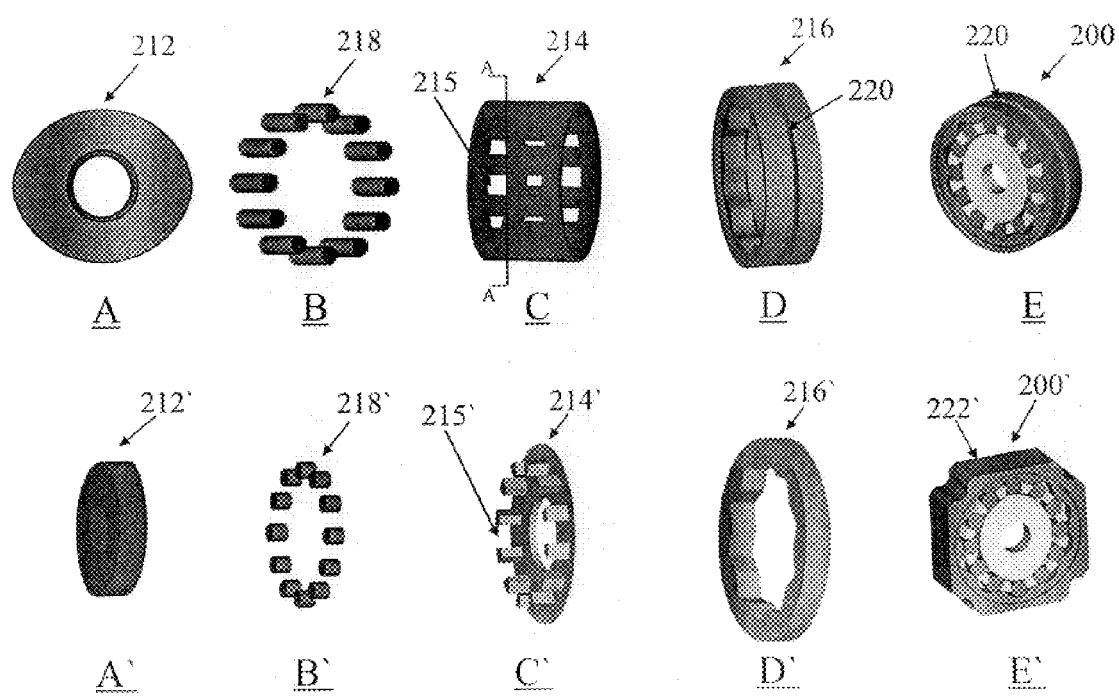
FIGS. 10A–E and A'–E' show alternative embodiments of the invention.

FIGS. 10A–E and A'–E ' shows two simplified embodiments 200, 200' of the invention. In FIGS. 10A–E, inner cam gear 212 is nested within intermediate slotted gear part 214 which in turn is nested within outer cam gear 216, with rollers 218 loaded in the slots 215 of part 214. FIG. 10E shows the slotted part through line A—A of FIG. 10C. Outer cam gear 216 is either a discrete part and joined into a pulley 220 or is formed integral with pulley 220. The pulley couples the outer cam gear 216 to the outside world. One of these gear parts is an input and one is an output. One or none of the three gear parts is grounded according to the desired function.

In the embodiment of FIGS. 10A'–E', inner cam gear 212' is nested within intermediate slotted gear 214' which in turn is nested within outer cam gear 216'. Outer cam gear 216' is a discrete part fitted into housing 222' (or alternatively is formed as part of housing 222'). Rollers 218' are loaded in slots 215' of slotted part 214'. In this embodiment the outer cam gear 216' as part of the fixed housing is a fixed reaction member for the two rotating gear parts 212' and 214'.

In accordance with preferred practice of a nested speed converter bearing apparatus of the invention, the speed conversion function depends on the combination of cam gears and slots that is selected for a particular application. As shown below the speed ratio is the ratio of input speed to the output speed, with a negative sign indicating a reversal of rotational direction between input and output.

In two example practices of the invention, below, the relationships between an inner cam gear (IG) with N1 teeth and an outer cam gear (OG) with N2 and an intermediate slotted member with N3* slots are shown.

EXAMPLE A

N3* is a Factor of N1+N2 and N3=N1+N2

| Case | Input | Output | Ground | Speed Ratio |
|---|---|---|---|---|
| A1 | IG | OG | RG | −N2/N1 |
| A2 | IG | RG | OG | N3/N1 |
| A3 | OG | IG | RG | −N1/N2 |
| A4 | OG | RG | IG | N3/N2 |
| A5 | RG | IG | OG | N1/N3 |
| A6 | RG | OG | IG | N2/N3 |

EXAMPLE B

N3* is a Factor of |N1−N2| and N3=N2−N1 (N3 may be negative)

| Case | Input | Output | Ground | Speed Ratio |
|---|---|---|---|---|
| B1 | IG | OG | RG | N2/N1 |
| B2 | IG | RG | OG | −N3/N1 |

-continued

| Case | Input | Output | Ground | Speed Ratio |
|------|-------|--------|--------|-------------|
| B3   | OG    | IG     | RG     | N1/N2       |
| B4   | OG    | RG     | IG     | N3/N2       |
| B5   | RG    | IG     | OG     | −N1/N3      |
| B6   | RG    | OG     | IG     | N2/N3       |

These and other embodiments of the invention will now be understood by those skilled in the relevant art. Variations of these teaching are also within the scope of this disclosure.

What is claimed is:

1. Apparatus for converting rotary motion, the apparatus comprising
    a conjugate pair of cam gear parts and a translating part,
    said translating part including slots to define a slotted part, and a roller device,
    wherein a first of said pair of conjugate parts comprises an inner cam gear and the second of said pair comprises an outer cam gear, said slotted part nested in between,
    all said parts mounted about a common axis and defining an input and an output rotatable at said axis,
    said cam gear parts coupled together via said roller device, said roller device comprising a roller seated in one of said slots,
    all said parts having front and rear faces, wherein said slotted part is essentially cylindrical and defines a front bearing surface around its inner circumference adjacent to its front face and a rear bearing surface around its inner circumference adjacent to its rear face and defines a front bearing surface around its outer circumference adjacent to its front face and a rear bearing surface around its outer circumference adjacent to its rear face,
    wherein said inner cam gear part is essentially cylindrical and defines a front bearing surface around its outer circumference adjacent to its front face and a rear bearing surface around its outer circumference adjacent to its rear face,
    wherein said outer cam gear part defines a front bearing surface around its inner circumference adjacent to its front face and a rear bearing surface around its inner circumference adjacent to its rear face,
    wherein said inner circumference bearing surfaces of said slotted part rotatably communicates with said bearing surfaces of said inner cam gear part and said outer circumference bearing surfaces of said slotted part rotatably communicate with said bearing surfaces of said outer cam gear part,
    wherein rotation of a first of said parts as said input rotates a second of said parts as said output, wherein said output rotation is dictated by the relationship of said cam gears and said slots.

2. Apparatus of claim 1 wherein said parts have open centers.

3. Apparatus of claim 1 wherein said roller device comprises a plurality of rolling elements, with a respective one of the elements associated with a respective one of the slots.

4. Apparatus of claim 3 wherein the slotted part comprises a cylindrical retainer device and the rolling elements are rollers.

5. Apparatus of claim 3 wherein each of said roller elements comprise a pin and a roller mounted concentrically about said pin.

6. Apparatus of claim 5 wherein said pin is hollow.

7. Apparatus of claim 5 wherein said pin contacts said slotted part and one of said cam gear parts and said roller contacts another of said cam gear parts.

8. Apparatus of claim 5 wherein said pin contacts said slotted part and said roller contacts both of said cam gear parts.

9. Apparatus of claim 5 wherein each of said rolling elements further comprises an outer roller mounted concentrically about said roller mounted about said pin.

10. Apparatus of claim 3 wherein each of the rolling elements comprises a pin and a plurality of rollers mounted concentrically about said pin.

11. Apparatus of claim 10 wherein said pin of each of said rolling elements contacts said slotted part and at least one of said plurality of rollers contacts a first of said cam gears and another of said plurality of rollers contacts a second of said cam gears.

12. Apparatus of claim 1 wherein the parts each define a respective central passageway extending along the central longitudinal axis of the apparatus along said common central axis.

13. Apparatus of claim 1 wherein one of said parts comprises a housing part for mounting of the apparatus.

14. Apparatus of claim 1 wherein one of said parts comprises a pulley.

15. Apparatus of claim 1 wherein one of said parts comprises a sprocket.

16. Apparatus of claim 1 wherein said inner cam gear is an input of the apparatus.

17. Apparatus of claim 1 wherein said inner cam gear is an output of the apparatus.

18. Apparatus of claim 1 wherein bearing elements are disposed between said rotatable communicating bearing surfaces.

* * * * *